(12) United States Patent
Channell

(10) Patent No.: US 7,692,536 B2
(45) Date of Patent: Apr. 6, 2010

(54) SYSTEM AND METHOD OF GENERATING RECOMMENDATIONS USING AN RFID-ENABLED RECOMMENDATION SYSTEM

(75) Inventor: Brian Channell, Redondo Beach, CA (US)

(73) Assignee: Yahoo! Inc., Sunnyvale, CA (US)

( * ) Notice: Subject to any disclaimer, the term of this patent is extended or adjusted under 35 U.S.C. 154(b) by 386 days.

(21) Appl. No.: 11/770,584

(22) Filed: Jun. 28, 2007

(65) Prior Publication Data

US 2009/0002166 A1    Jan. 1, 2009

(51) Int. Cl.
*G08B 26/00* (2006.01)
(52) U.S. Cl. .............. 340/505; 340/10.1; 340/572.1; 340/572.9; 340/692
(58) Field of Classification Search ........... 340/505, 340/10.1, 572.1–572.9, 692
See application file for complete search history.

(56) References Cited

U.S. PATENT DOCUMENTS

| 6,759,637 | B2 |   | 7/2004  | Kim |
| 6,847,912 | B2 |   | 1/2005  | Forster |
| 6,975,910 | B1 | * | 12/2005 | Brown et al. ............... 700/90 |
| 6,982,640 | B2 | * | 1/2006  | Lindsay et al. ............ 340/540 |
| 7,107,836 | B2 |   | 9/2006  | Brookner |
| 7,283,882 | B1 | * | 10/2007 | Bransky et al. ............ 700/96 |
| 7,523,302 | B1 | * | 4/2009  | Brown et al. ............... 713/155 |
| 2009/0095813 | A1 | * | 4/2009 | Chang et al. ............... 235/385 |

\* cited by examiner

*Primary Examiner*—Daryl Pope
(74) *Attorney, Agent, or Firm*—Fiala & Weaver P.L.L.C.

(57) ABSTRACT

A RFID-enabled recommendation system and related method utilizing information from RFID tags of products (e.g., foodstuffs) to generate recommendations regarding said products. In accordance with one aspect, a server generates recommendations based on product-specific information sent from a RFID tag.

25 Claims, 3 Drawing Sheets

SYSTEM AND METHOD OF GENERATING RECOMMENDATIONS USING AN RFID-ENABLED RECOMMENDATION SYSTEM

BACKGROUND

1. Field of the Invention

Aspects of the present invention relate generally to generating recommendations using radio-frequency identification (RFID), and more particularly to a system and method that may utilize information from RFID tags of products (e.g., foodstuffs) to generate recommendations regarding said products.

2. Description of Related Art

Radio Frequency Identification (RFIDs) is a method wherein information regarding a object may be stored on a RFID tag (e.g., a silicon chip) and remotely retrieved. RFID tags are typically small devices, and may comprise a miniature antenna. A scanner/receiver/transmitter (hereinafter "scanner") may solicit the RFID tag with an electronic signal. In response, the tag may return an electronic signal readable by the scanner.

RFID tags are typically of two types, "passive" and "active". Active RFID tags comprise a power source to transmit a response signal. Passive RFID tags do not, and utilize the electrical current induced in the antenna from an incoming signal to power a response.

RFID has numerous commercial applications. For example, RFID technology is currently used in passports, transport payments (e.g., tolls), product tracking, manufacturing systems, and inventory systems.

RFID may be used in the field of food storage as well. Typically, food products come with an "expiration date", a period during which the food product is expected to remain fresh. If the expiration date passes, the food item is no longer recommended as edible, and may therefore be wasted. If, using RFID tags, a consumer is periodically made aware of foodstuffs nearing expiration, she may be able to make a concerted effort to use them.

Therefore, in many instances, it may be desirable to provide a method and system that may utilize information from RFID tags of products (e.g., foodstuffs) to generate recommendations. Such a method and system may employ a RFID-enabled framework to generate recommendations, ensuring products are consumed or enjoyed in an appropriate time and manner.

SUMMARY

Embodiments of the present invention overcome the above-mentioned and various other shortcomings of conventional technology, providing a RFID-enabled recommendation system and related method utilizing RFID tags of products (e.g., foodstuffs) to generate recommendations. In accordance with one aspect, a server generates recommendations based on product-specific information sent from a RFID tag.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Figure 1:
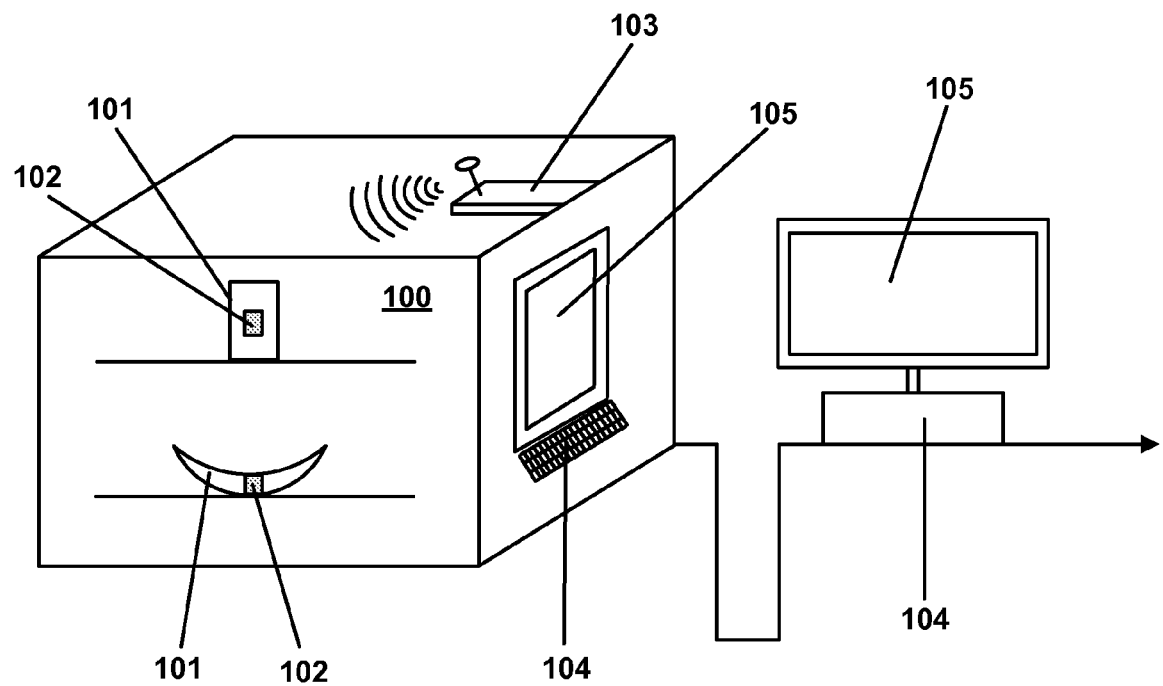
FIG. 1 is a simplified diagram of one embodiment of an exemplary food storage location incorporating a RFID-enabled recommendation system and related methodology.

Detailed descriptions of one or more embodiments of the invention follow, examples of which may be graphically illustrated in the drawings. Each example and embodiment are provided by way of explanation of the invention, and not meant as a limitation of the invention. For example, features or described as part of one embodiment may be utilized with another embodiment to yield still a further embodiment. It is intended that the present invention include these and other modifications and variations.

An embodiment RFID-enabled recommendation system may comprise RFID tags associated with stored food products to transmit product-specific information. Product-specific information is any information regarding one or more stored products that may be stored on RFID tags. Product-specific information is not intended to be limited in scope. For example, product-specific information may include product type (e.g., condiment/staple, liquid/solid), brand information, freshness date, expiration date, date made or prepared, and so forth. Other types of product-specific information may include ingredients of the food product, storage instructions, preparation instructions, dietary and nutritional information, purchase date, the date the product was placed into storage, etc. Product-specific information may also include the state of the item. For example, RFID tags may be utilized to store product state information such as the amount remaining (e.g., by weight, by volume), temperature, and relative freshness.

RFID-enabled recommendation systems and related methods are not meant to be limited to any particular food storage location or number of food storage locations. For example, the food storage location may be a refrigerator, pantry, closet, storage room, and generally any location in which food products may be stored.

An embodiment of an RFID-enabled recommendation system may comprise a scanner located anywhere in operable vicinity of a food storage location. For example, if the location is a pantry, the scanner may be located on the pantry door.

FIG. 1 is a simplified diagram of an exemplary food storage location incorporating one embodiment of a RFID-enabled recommendation system and related methodology. In this example, the food storage location is a refrigerator 100. Refrigerator 100 may be used to store any food product 101 bearing an RFID tag 102 associated therewith. A scanner 103 may be located in an operable vicinity. Scanner 103 may scan products 101 located in refrigerator 100 to accumulate product-specific information. Computer system 104 may be provided as well, and may comprise a memory unit (not shown) to store, among other things, the product-specific information transmitted by RFID tags 102. Computer system 104 may be a part of refrigerator 100 or may be independent. Monitor 105 having a visual display may display, among other things, product-specific information accumulated by scanner 103. Monitor 105 may be part of computer system 104 or may be independent.

Individual elements depicted in FIG. 1 are not intended to exclude other possibilities, as those of skill in the art will appreciate that the foregoing systems are susceptible of various modifications and alterations. For example, a food storage location incorporating one embodiment of a RFID-enabled recommendation system may not comprise a monitor or a computer system.

Figure 2:
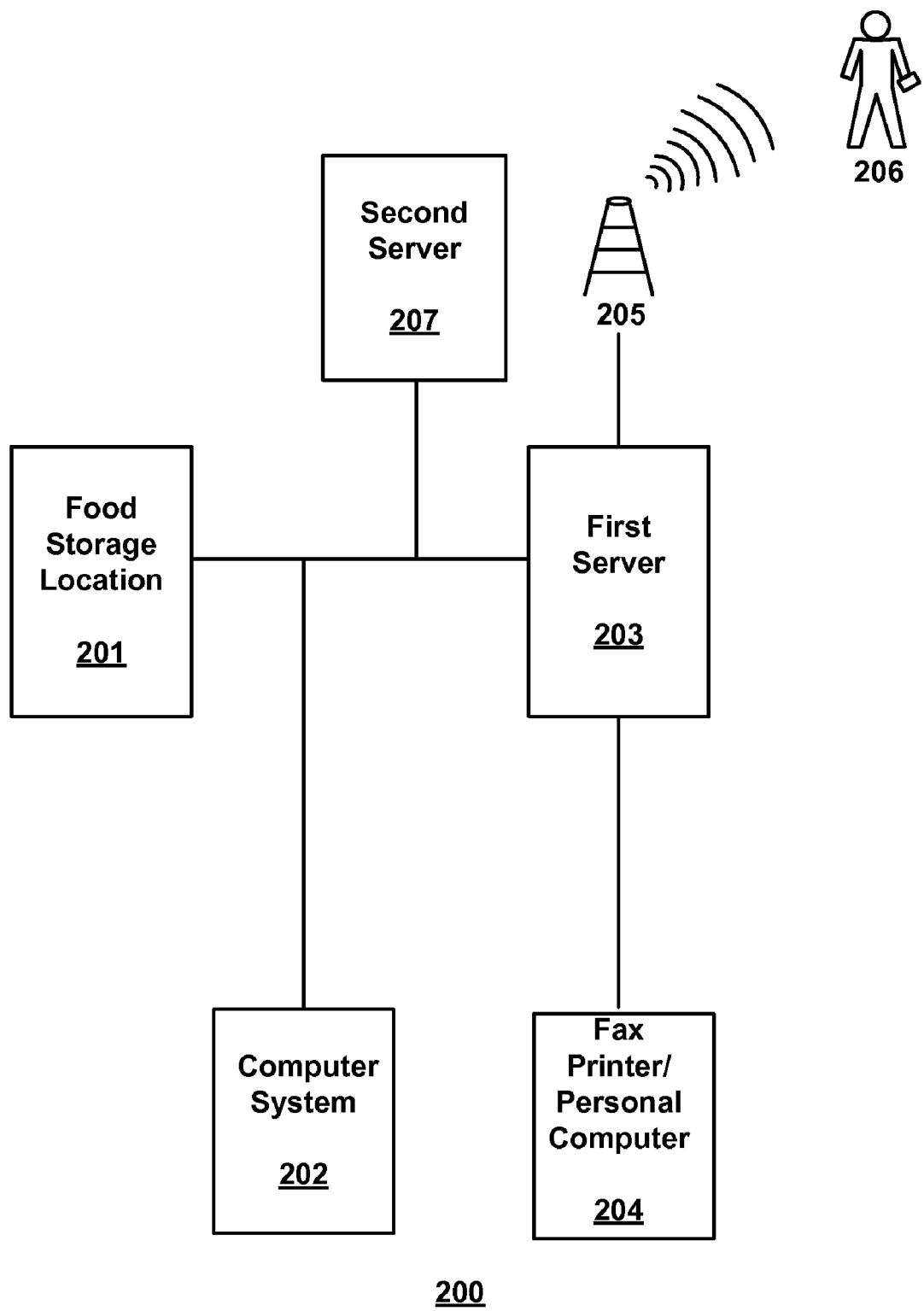
FIG. 2 is a simplified diagram illustrating one embodiment of a RFID-enabled recommendation system.

FIG. 2 is a simplified diagram illustrating one embodiment of a RFID-enabled recommendation system. As illustrated, RFID-enabled recommendation system 200 may comprise food storage location 201 (e.g., refrigerator 100, FIG. 1) connected to computer system 202 (e.g., computer system 104, FIG. 1). Food storage location 201 and computer system 202 may further be connected to first server 203, which may utilize product-specific information to generate recommendations.

First server 203 may be connected to various external destinations. External destinations include any entity capable of receiving or transmitting a electronic transmission, and may include, for example, a handheld device (e.g., a Blackberry) or a mobile phone. External destinations may also include a server (e.g., hosting instant message programs, eBooks or email services), a fax machine, a printer, or a personal computer.

As illustrated in FIG. 2, first server 203 may be connected to external destinations such as fax/printer 204 and/or a second server 207. Second server 207 may be utilized to store and transmit recommendations generated by the RFID-enabled recommendation system. First server 203 may also be connected to a communications system 205, which may transmit/receive electronic data (e.g., recommendations) to/from a handheld device 206.

External destinations may be accessible by any user. As used herein, the term "user" is used to denote any person who may access a RFID-enabled recommendation system.

As used herein, a server (e.g., first server 203 or second server 207, FIG. 2) may comprise, for example, but is not limited to, a personal computer, a mainframe computer, a data processing unit, a data storage unit or the like. A server may comprise one or more computers, and may be connected to, for example the Internet, via broadband connection in any of various ways generally known in the art (e.g., cable, DSL, fiber, satellite, etc.), or via other communications technology and protocols developed and operative in accordance with known principles.

Individual elements depicted in FIG. 2 are not intended to exclude other possibilities, as those of skill in the art will appreciate that the foregoing systems are susceptible of various modifications and alterations. For example, fax/printer 204 in FIG. 2 may be replaced by a personal computer bearing a monitor capable of displaying recommendation information through a web page browser. Also, for example, a scanner (e.g., scanner 103, FIG. 1) may send product-specific information directly to first server 203.

Figure 3:
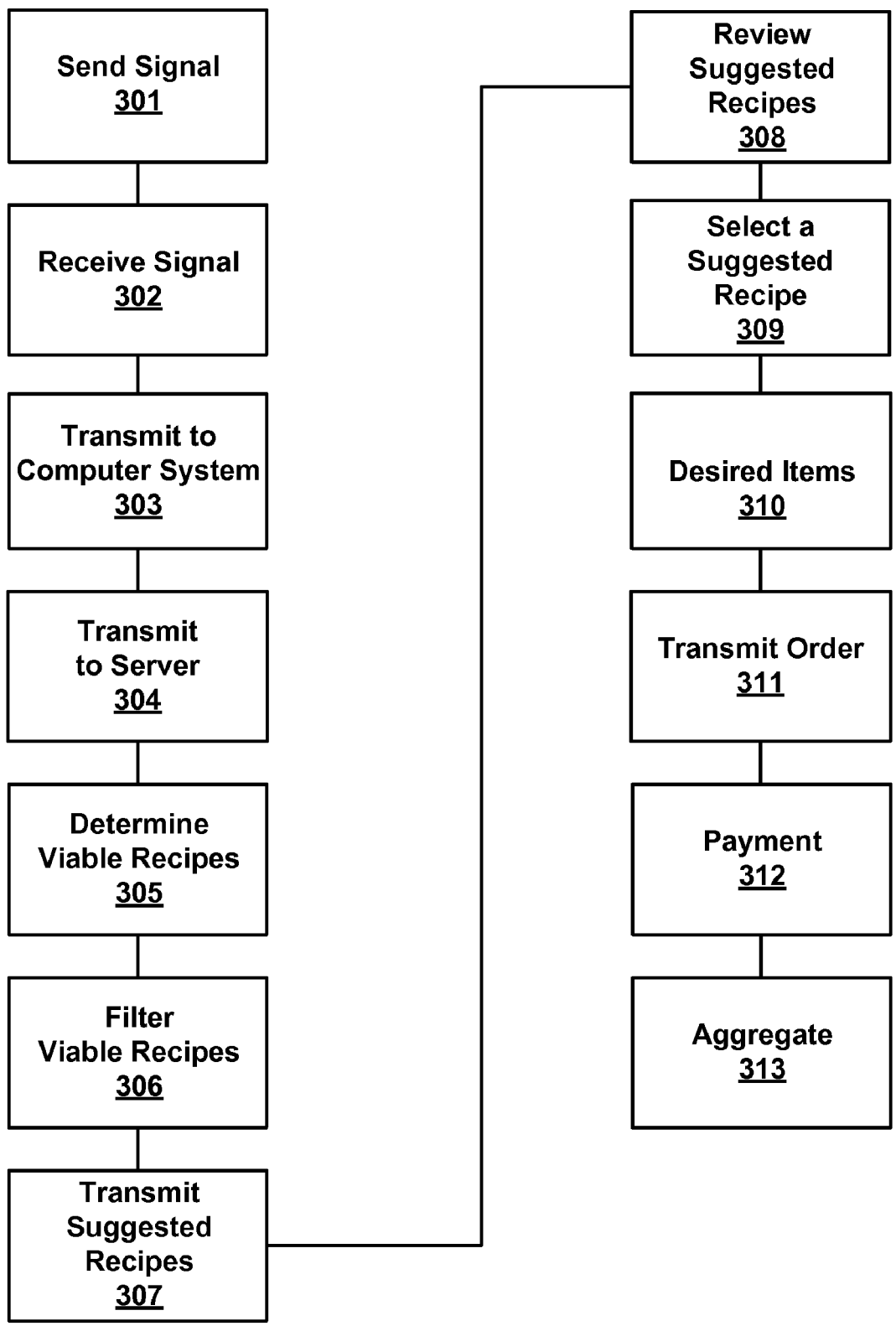
FIG. 3 is a simplified block diagram illustrating operation of one embodiment of a method of generating recommendations implementing a RFID-enabled recommendation system.

FIG. 3 is a simplified block diagram illustrating operation of one embodiment of a method of generating recommendations implementing a RFID-enabled recommendation system. As indicated at block 301, a method may begin with a RFID tag (e.g., RFID tag 102, FIG. 1) associated with a food product (e.g., food product 101, FIG. 1) sending a signal with product-specific information to a scanner (e.g., scanner 103, FIG. 1). Types of product-specific information are discussed above. If the RFID tag is an active tag, it may originate the signal randomly, upon command or periodically. If the RFID tag is a passive, it may return the signal after being solicited by a scanner. The scanner may solicit the passive tag periodically, randomly or upon command.

At block 302, the scanner receives the signal including the product-specific information.

At block 303, the scanner may transmit the signal including the product-specific information to a computer system (e.g., computer system 104, FIG. 1). The scanner may transmit the signal including the product-specific information periodically, randomly or upon command.

At block 304, the computer system may transmit the product-specific information to server (e.g., first server 203, FIG. 2). For example, the computer system may send the product-specific information to a server maintained by Yahoo! Food (http://food.yahoo.com/). The computer system may transmit the product-specific information periodically, randomly or upon command.

At block 305, the server may consider all available recipes and determine the viable recipes based on the received product-specific information. Viable recipes include recipes that may be prepared based on the received product-specific information. Viable recipes include currently and potentially viable recipes. Currently viable recipes are those requiring no further items for preparation. Potentially viable recipes are those requiring additional items for preparation ("necessary items"). The server may contain at least one program to determine currently viable and potentially viable recipes based on the product-specific information.

Next, as indicated at block 306, the server may utilize at least one program (e.g., the program described in block 305) to filter the viable recipes. The criteria to filter the viable recipes may include, for example, personal, impersonal, or selection criteria.

Personal criteria include any criteria personal to a user. Examples of personal criteria may be personal dietary habits (e.g., vegetarian, vegan, etc.), preferences/dislikes, budgets, and number of people typically attending a meal (and each attendees' preferences), etc. Other personal criteria may include daily preferences, commute times, religious personal holidays/special occasions celebrated, and preferred food preparation times.

Personal criteria may be stored in a centralized location and accessed to supplement the recommendation process (e.g., first server 203 or second server 207, FIG. 2). For example, personal criteria may be available from a personal user account available through Yahoo! (http://my.yahoo.com/). If the personal user account is linked to other accounts, the preferences indicated in the other accounts may be taken into account as well. So, for example, if user A designates member B as a "friend" or a member of his "community", and member B likes a certain recipe, the program may consider presenting that recipe to user A.

Impersonal criteria, on the other hand, include any criteria that are not personal to a user. Examples of impersonal criteria may include seasonal information, holidays/special occasions, prices of items, preferences of the general community etc.

Selection criteria include criteria relating to presentation format of the suggested recipes. For example, selection criteria may include the total number of suggested recipes, inclusion of a predetermined number of either potentially or currently viable recipes, or a predetermined ratio of potentially to currently viable recipes. Selection criteria may be determined by the program or set by a user. A user's selection criteria may be gathered from a personal account, as described above.

The program may employ any type of information, including personal, impersonal, and selection criteria, to filter the viable recipes and generate a selection of suggested recipes. Suggested recipes are the recipes to be recommended to a user. The term "suggested recipes" may include any information relating to the suggested recipes, such as preparation time, nutrition information, etc.

The suggested recipes may include solely currently viable recipes, solely potentially viable recipes, or some combination of both. Each potentially viable recipe included in the suggested recipes may include necessary items. The term "suggested recipes" as used herein may include necessary items.

The suggested recipes may be ranked in order of expected preference. Expected preference may be determined in a number of ways. For example, over time user preferences may be mined to identify possible trends (e.g. an individual user may eat fish a certain percentage of the time, or on particular days of the week, or for particular meals on certain days; or a community which the user may consult may eat salads a certain percentage of the time, or for certain meals, etc.) Specific data mining techniques are not critical to the invention, but will be known to ordinarily skilled artisans, and so need not be detailed here.

Remaining at block 306, the server may also generate peripheral items. Peripheral items are items not items necessary for the preparation of a suggested recipe, but may be combined with the suggested recipe. For example, if the system recommends a seafood recipe (either currently viable or potentially viable), it may recommend a bottle of white wine to accompany the meal. The term "suggested recipes" as used herein may include peripheral items.

The server may recommend specific brands relating to any item (e.g., peripheral items, necessary items etc.) discussed herein.

At block 307, the server may transmit the suggested recipes to any external destination (as described above). For example, the suggested recipes may be transmitted to a user's handheld device (e.g., personal device 206, FIG. 2). The server may transmit the suggested recipes randomly, in real-time, or at a predetermined time (e.g., every day at 5:00 p.m.).

At decision block 308, a user reviews the suggested recipes.

At block 309, the user selects a suggested recipe. For example, the user may utilize her handheld device described in the example of block 307 to review and select a suggested recipe.

Next, as indicated at block 310, the RFID-enabled recommendation system may allow a user to gather desired items. Desired items include all of the items the user wishes to acquire, and may include necessary items, peripheral items, or other items (e.g., items unrelated to the selected recipe). For example, if the user has selected a currently viable recipe (and does not require any necessary items for preparation), the user may also select a peripheral item to order. Alternatively, if the user has a selected a potentially viable recipe (and therefore does require a necessary item for preparation), and wishes to add a peripheral item to supplement the meal, she may order the necessary item and the peripheral item. The order may take any form (e.g., an electronic order form) that facilitates purchase of the desired items. The term "suggested recipe" as used herein may include a means to order desired items.

At block 311, the RFID-enabled recommendation system may allow a user to transmit an order for desired items. For example, the desired items can be sent via the Internet to Yahoo!Shopping (http://shopping.yahoo.com) to purchase for home delivery. Alternatively, they may be sent to a grocery vendor that allows customers to automatically place electronic orders for groceries over the Internet for pickup or delivery. Therefore, for example, the user described in the example of block 307 may use her handheld device to transmit an order for desired items electronically to a local grocery store for pickup or delivery. The term "suggested recipe" as used herein may include vendor suggestions (considering such criteria as lowest price, commute time, etc.) and driving directions.

As indicated at block 312, the RFID-enabled recommendation system may allow the user to place a payment in any of various payment methods generally known in the art (e.g., credit card, Paypal® etc.), or via other feasible payment methods and protocols developed and operative in accordance with known principles.

At block 313, transaction information may be aggregated at a server (e.g., first server 203 or second server 207, FIG. 2). Transaction information includes any information relating to the operation of an RFID-enabled recommendation system. For example, transaction information may include selection information (e.g., block 309), order information (e.g., block 310), payment information (e.g., block 311), etc. The aggregated transaction information may be then be used to supplement the generation of future recommendations.

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, block 309 as illustrated in FIG. 3 may not require a user to make a selection at all. Instead, an embodiment of an RFID-enabled recommendation system may allow automatic selection of one of the suggested recipes. Also, for example, at block 310, a user may preset a user preference to automatically add any number of peripheral items to the order for the selected recipe as well. The features described at blocks 311 and 312 may be automated as well. Furthermore, the operation described in block 313 may occur concurrently with the operation of any of blocks 301-312. Also, for example, in certain embodiments of the RFID-enabled recommendation system, the operations described in block 306 may be performed before the operations described in block 305. Specifically, the criteria described in block 306 may be used to determine a group of recipes, which may then be further filtered using the determinations described in block 305.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for electronic generation and transmission of food-related recommendations, said method comprising:
   receiving information relating to at least one stored food product;
   determining at least one viable recipe based on said information, said at least one viable recipe distinguishing between a potentially viable recipe and a currently viable recipe;
   generating a suggested recipe from said at least one viable recipe; and
   transmitting said suggested recipe.

2. The method of claim 1, wherein said generating a suggested recipe from said at least one viable recipe comprises filtering said at least one viable recipe to generate said suggested recipe.

3. The method of claim 2 wherein said filtering specifies a predetermined number of either potentially or currently viable recipes.

4. The method of claim 2 wherein said filtering specifies a predetermined ratio of potentially to currently viable recipes.

5. The method of claim 2 wherein said filtering specifies only one of currently viable recipes and potentially viable recipes.

6. The method of claim 5 wherein said filtering employs criteria personal to a user.

7. The method of claim 5 wherein said filtering employs criteria not personal to a user.

8. The method of claim 5 wherein said filtering employs criteria relating to presentation format.

9. The method of claim 1 wherein said generated suggested recipe includes an order form.

10. The method of claim 1 wherein said generated suggested recipe includes a necessary item.

11. The method of claim 1 wherein said generated suggested recipe includes an item not necessary for preparation of a suggested recipe, but to be combined with the suggested recipe.

12. The method of claim 1 wherein a radio frequency identification (RFID) tag transmits said product-specific information.

13. The method of claim 6, wherein said criteria personal to a user employs preferences of other accounts designated by the user.

14. The method of claim 7, wherein said criteria not personal to a user employs preferences of a community to which the user belongs.

15. A system for generating recommendations, said system comprising:
 a RFID tag to transmit information relating to at least one stored food product;
 a scanner to receive and transmit said information relating to at least one stored food product;
 a server to:
  (a) receive said transmitted information relating to at least one stored food product,
  (b) determine at least one viable recipe based on said transmitted information, said at least one viable recipe distinguishing between a potentially viable recipe and a currently viable recipe,
  (c) generate a suggested recipe from said at least one viable recipe, and
  (d) transmit said suggested recipe to an external destination.

16. The system of claim 15 wherein said generating a suggested recipe from said at least one viable recipe comprises filtering said at least one viable recipe to generate said suggested recipe.

17. The system of claim 16 wherein said filtering specifies a predetermined number of either potentially or currently viable recipes.

18. The system of claim 16 wherein said filtering specifies a predetermined ratio of potentially to currently viable recipes.

19. The system of claim 16 wherein said filtering specifies only one of currently viable recipes and potentially viable recipes.

20. The system of claim 19 wherein said filtering employs criteria personal to a user.

21. The system of claim 19 wherein said filtering employs criteria not personal to a user.

22. The system of claim 19 wherein said filtering employs criteria relating to presentation format.

23. The system of claim 15 wherein said generated suggested recipe includes one of an order form, a necessary item, and an item not necessary for preparation of a suggested recipe, but to be combined with the suggested recipe.

24. The system of claim 20, wherein said criteria personal to a user employs preferences of other accounts designated by the user.

25. The system of claim 21, wherein said criteria not personal to a user employs preferences of a community to which the user belongs.

* * * * *